United States Patent [19]

Morris

[11] Patent Number: 5,242,190
[45] Date of Patent: Sep. 7, 1993

[54] UNITARY SENSOR ASSEMBLY FOR AUTOMOTIVE VEHICLES

[75] Inventor: Peter T. Morris, Northville, Mich.

[73] Assignee: Ford Motor Company, Dearborn, Mich.

[21] Appl. No.: 632,820

[22] Filed: Dec. 24, 1990

[51] Int. Cl.⁵ ............................................... B60G 11/26
[52] U.S. Cl. ...................................................... 280/707
[58] Field of Search ................ 280/707, 6.12, DIG. 1, 280/112.2, 703; 307/10.1

[56] References Cited

U.S. PATENT DOCUMENTS

| | | | |
|---|---|---|---|
| 3,124,368 | 3/1964 | Corley et al. | |
| 3,603,612 | 9/1971 | Hill et al. | 280/707 |
| 4,065,154 | 12/1977 | Glaze | 280/707 |
| 4,310,172 | 1/1982 | Claude et al. | 280/707 |
| 4,700,971 | 10/1987 | Doi et al. | 280/707 |
| 4,712,807 | 12/1987 | Kurosawa | 280/707 |
| 4,743,046 | 5/1988 | Schnittger | 280/707 |
| 4,763,222 | 8/1988 | Heaston et al. | 280/707 |
| 4,788,489 | 11/1988 | Kobayashi et al. | 280/707 |
| 4,804,203 | 2/1989 | Glab et al. | 280/707 |
| 4,827,416 | 5/1989 | Kawagoe et al. | 364/424.05 |
| 4,830,398 | 5/1989 | Williams et al. | 280/707 |
| 4,834,419 | 5/1989 | Kozaki et al. | 280/707 |
| 4,836,578 | 6/1989 | Soltis | 280/708 |
| 4,892,328 | 1/1990 | Kurtzman et al. | 280/840 |

Primary Examiner—Margaret A. Focarino
Assistant Examiner—Paul Dickson
Attorney, Agent, or Firm—Raymond L. Coppiellie; Roger L. May

[57] ABSTRACT

A unitary sensor assembly for use in an automotive vehicle having a source of electrical power, a body and an automotive suspension relatively moveable with respect to the body is disclosed, the assembly comprises a sensor for determining operational position on the suspension with respect to the body as well as the acceleration of the body of the vehicle with respect to the surface upon which the vehicle is traveling from a common point on the vehicle. The assembly of the present invention further includes an electrical power transmission circuit mounted to the first sensor and electrically interconnecting the first and second sensors for transmitting electrical power from the electrical power source of the vehicle to the sensor. An apparatus for controlling an adjustable suspension unit is also disclosed comprising a unitary sensor assembly of the present invention as well as a processor for receiving a series of signals generated from the sensor and a control for adjusting the suspension unit.

8 Claims, 3 Drawing Sheets

UNITARY SENSOR ASSEMBLY FOR AUTOMOTIVE VEHICLES

BACKGROUND OF THE INVENTION

1. Field of the Invention

The present invention relates generally to a sensor assembly for use with a suspension system of an automotive vehicle. More particularly, the present invention relates to a unitary sensor assembly for determining the operational position of the suspension as well as the acceleration of the vehicle body with respect to the surface upon which the vehicle is traveling.

2. Disclosure Information

Automotive suspensions employing adjustable suspension units typically utilize a plurality of height or position sensors for detecting the position of one or more portions of the suspension with respect to another part of the suspension itself or another part of the chassis of the vehicle. In the case of vehicles utilizing load leveling, air, hydropneumatic, or other semi-active or active suspension systems, it is necessary to know the ride height of the vehicle in order to determine whether ride height correction is required. In the event, for example, that the ride height is less than prescribed limits, as determined by a height sensor, an adjustable suspension unit may be given a command to increase ride height. Conversely, in the event the ride height exceeds the prescribed limits, the adjustable suspension unit may be given the command to lower, or decrease the ride height.

Furthermore, the vehicle ride is influenced greatly by the road conditions. Evaluation of vehicle ride includes measuring the acceleration of the vehicle body with respect to the surface upon which the vehicle is traveling to adjust the suspension unit to dampen the harshness of the vehicle ride due to the road conditions. Typically, an acceleration detecting means, such as an accelerometer, is arranged at part of the vehicle body to determine the motion vibrations of the body due to road conditions.

In typical active and semi-active suspension systems, separate height sensors and accelerometers are employed at various locations surrounding the vehicle to generate the above-described information so that the suspension unit may be controlled to respond to given road and load conditions. For example, U.S. Pat. Nos. 4,834,419; 4,827,416; 4,743,046; 4,712,807; 4,700,971; 4,065,154; 3,603,612; and 3,124,368 disclose various suspension control systems and associated componentry utilizing height sensors separate and apart from acceleration sensors surrounding the vehicle. In utilizing separate height and acceleration sensors, there is often a time delay in the information sent to the system controller due to the distance between the sensors. This time delay often results in undesirable cross correlation of the sensed information. Furthermore, the amount and cost of the electronics associated with a system employing separate height and acceleration sensors is increased and installation of a plurality of sensors into a limited amount of space is complicated. Therefore, there is a need for a unitary sensor assembly combining a height and acceleration sensor into a single assembly which negates the undesirable cross correlation effects and reduces the complexity of the electronic circuitry involved with separate sensors and which easily installs into tight vehicle areas.

U.S. Pat. No. 4,804,203, assigned to the assignee of the present invention, discloses a suspension control system for operating an adjustable suspension unit. The system utilizes a single sensor for measuring ride height and relative vertical velocity of a suspension with respect to the vehicle chassis. The sensor of the '203 patent is a height sensor which produces a signal corresponding to the position of the road wheel and tire assembly of the vehicle with respect to the vehicle chassis. A processor receives this set of signals and calculates vertical acceleration of the road wheel with respect to the chassis through a complex algorithm. The calculation of vertical velocity in the '203 system is time consuming and may be too lengthy to be of advantage in real time active suspension systems.

It is an object of the present invention to provide a unitary sensor assembly for use with an automotive suspension system wherein the assembly provides suspension position and acceleration information from the same point of the suspension to eliminate cross correlation of sensed information.

It is a further object of the present invention to provide a unitary sensor assembly for use with an automotive suspension wherein the assembly includes a height and acceleration sensing means electrically connected to a single circuit board.

It is a further object of the present invention to provide a system for controlling an adjustable suspension unit, the system utilizing a unitary sensor assembly for generating signals corresponding to the operational position of the suspension members with respect to each other and to the acceleration of the vehicle body with respect to the surface upon which the vehicle is traveling so that the suspension unit may be controlled.

It is an advantage of the present invention to reduce the complexity and cost associated with multiple, separated sensors surrounding the vehicle by providing a unitary sensor assembly utilizing a common circuit board for supplying power to the height and acceleration sensing means of the assembly.

These and other objects, features and advantages of the present invention will be readily apparent from the drawings, description and claims which follow.

SUMMARY OF THE INVENTION

There is provided herein a unitary sensor assembly for use in an automotive vehicle having a source of electrical power, a body and an automotive suspension relatively movable with respect to the body comprising a first sensor means for determining the operational position of the suspension with respect to the body. The first sensor means includes a first sensor component movable with respect to a second sensor component and means for attaching the first sensor component to the suspension and for attaching the second sensor component to the body of the vehicle such that the first and second sensor components will be caused to move with respect to one another when the suspension moves with respect to the body. The sensor assembly further includes a second sensor means for determining the acceleration of the body of the vehicle with respect to the surface upon which the vehicle is traveling and electrical power transmission means mounted to the first sensor means and electrically interconnecting the first and second sensor means for transmitting electrical power from the electrical power source of the vehicle to the first and second sensor means.

The electrical power transmission means comprises an oscillator circuit means, an electrical input protection means and a common power supply means electrically connected to a common circuit board. The first and second sensor means are interconnected with the common circuit board.

There is further disclosed herein an apparatus for controlling an adjustable suspension unit of a motor vehicle having a source of electrical power, a body, a chassis and an automotive suspension relatively movable with respect to the body, the apparatus comprising a unitary sensor assembly including a circuit board for transmitting electrical power from the electrical power source of the vehicle to the sensor assembly and a first sensor means for determining the operational position of the suspension with respect to the body and for generating a first set of signals corresponding to the operational position. The first sensor means is electrically connected to the circuit board and includes a first sensor component movable with respect to a second sensor component and means for attaching the first sensor component to the suspension and for attaching the second sensor component to the body of the vehicle such that the first and second sensor components will be caused to move with respect to one another when the suspension moves with respect to the body.

The sensor assembly of the apparatus further includes a second sensor means for determining the acceleration of the body of the vehicle with respect to the surface upon which the vehicle is traveling and for generating a second set of signals corresponding to the acceleration, the second sensor means also being electrically connected to the circuit board. In one embodiment of the apparatus of the present invention, the second sensor means comprises an accelerometer which may be mounted to either the first or second sensor component of the first sensor means. Similarly, the circuit board may also be mounted to either the first or second sensor component of the first sensor means.

The system further includes a processor means operatively associated with the sensor assembly for determining the need for and for adjusting the suspension unit. The processor means comprises means for receiving the first set of position signals and for calculating the vertical velocity of the road wheels with respect to the chassis based upon the position signals, means for receiving the second set of signals from the second sensor means and means for generating a control signal to adjust the suspension unit based upon the first and second set of signals.

DETAILED DESCRIPTION OF THE PREFERRED EMBODIMENTS

Figure 1:
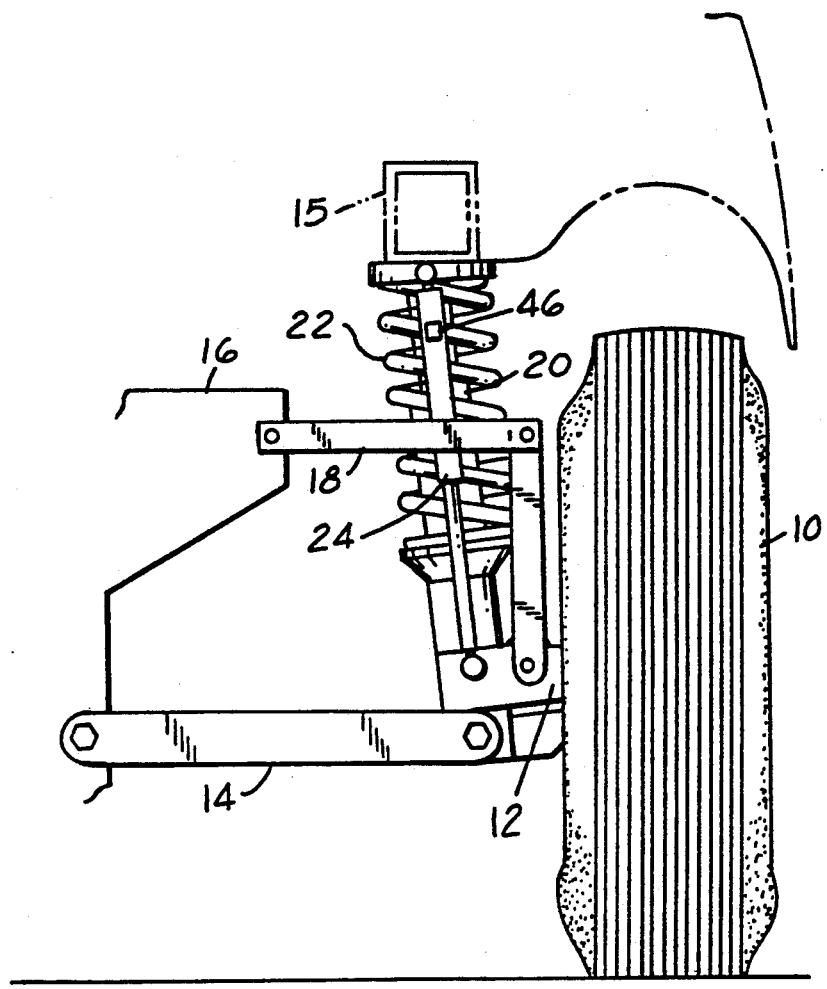
FIG. 1 is a front elevational view of an automotive suspension equipped with a telescoping or linear suspension sensor assembly according to the present invention.
Figure 2:
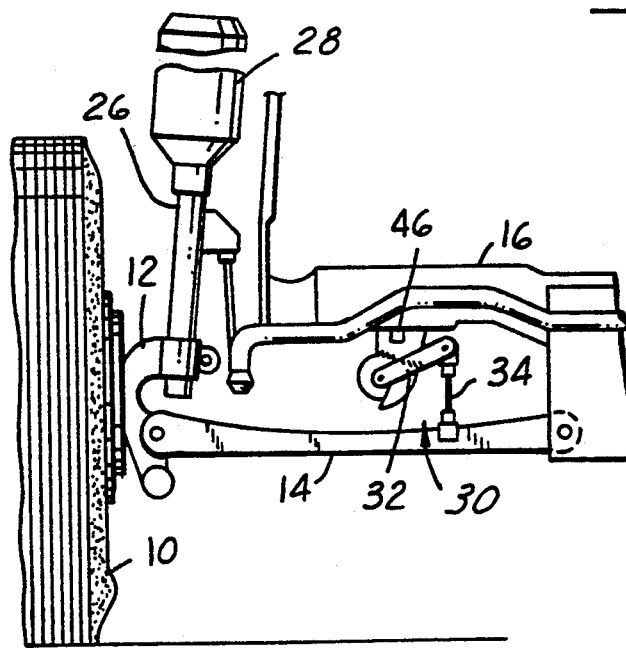
FIG. 2 is a front elevational view of an automotive suspension equipped with a rotary suspension sensor assembly according to the present invention.

As shown in FIGS. 1 and 2, a suspension sensor assembly according to the present invention is intended for use with an automotive suspension including road wheel and tire assembly 10 rotatably attached to a wheel carrier 12. Each of the suspensions shown in FIGS. 1 and 2 includes a lower control arm 14 having an inboard end pivotally attached to chassis 16 of the vehicle and an outboard end pivotally attached to wheel carrier 12. The suspension shown in FIG. 1 also includes an upper control arm 18 pivoted between the upper end of the wheel carrier 12 and the chassis 16, and a suspension spring 22 interposed between a first spring seat associated with lower control arm 14 and a second spring seat associated with the chassis 16. As such, the chassis comprises part of the suspension because it includes attachment points for the various moving parts of the suspension. Finally, the suspension in FIG. 1 also includes at least one adjustable suspension unit 20 and linear sensor assembly 24 mounted between wheel carrier 12 and body 15 such that vertical movement of the road wheel 10 will be accompanied by telescoping movement of sensor assembly 24.

In addition to the elements previously enumerated, the suspension of FIG. 2 includes at least one adjustable McPherson strut 26 having a lower end rigidly attached to wheel carrier 12 and an upper end which extends through ride height adjuster 28. The upper end of strut 26 extending above ride height adjuster 28 is resiliently or pivotally attached to the chassis of the vehicle in conventional fashion. The suspension in FIG. 2 is completed by the suspension sensor assembly 24 which includes a rotary position sensor 30 which senses the vertical position of the road wheel with respect to the chassis. As may be seen from FIG. 2, this sensing results from the connection of position sensor 30 between the chassis 16 and lower control arm 14 such that the motion of lower control arm 14 which accompanies the vertical movement of the road wheel will be translated into rotary motion of the sensor by crank arm 32 and connecting link 34.

Those skilled in the art will appreciate in view of this disclosure that although the present suspension systems have been described in view of well known parallel arm and McPherson strut configurations, a sensor assembly according to the present invention could be utilized with a variety of suspension configurations including modified McPherson strut, Hotchkiss, quadralink, or other types of suspension configurations. It will further be appreciated that an assembly according to the present invention could be utilized with suspension systems featuring not only controllable damping or controllable ride height, but also those systems in which both damping and ride height are controlled. Further, the sensor assembly disclosed herein would likely be useful for providing operational data for other types of hydraulic, electric, or electromagnetic semi-active or active vehicular suspension systems.

Figure 3:
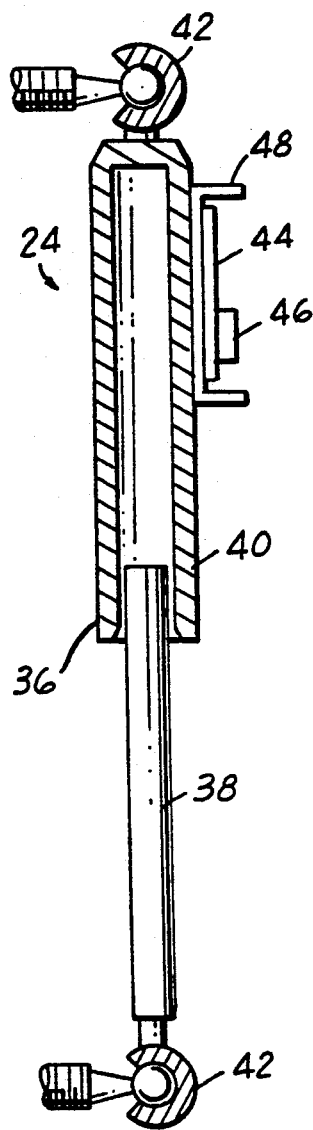
FIG. 3 is a schematic, side elevational view of the linear sensor assembly of FIG. 1.

As shown in FIG. 3, a linear sensor assembly 24 of the present invention includes a height sensing means 36 for determining the operational position of the vertical location of the road wheel and tire assemblies with respect to the body or chassis of the vehicle. Height sensor 36 includes a first sensor component 38 which slidably reciprocates within a second sensor component 40 as the road wheel and tire assembly 10 moves vertically with respect to the vehicle. Each of the first and second sensor components, 38, 40 respectively, includes a ball stud and socket assembly 42 for attaching the respective sensor components to the lower control arm 14 and the vehicle body 15 (FIG. 1). As shown in FIG. 3, the height sensor 36 is a linear variable displacement transformer (LVDT) but it should be readily apparent to those skilled in the art that other types of height sensing means may also be utilized. Those skilled in the art will appreciate in view of this disclosure that other types of road wheel vertical position sensors such as the rotary Hall effect sensor shown in FIG. 2 or other types of linear or rotary resolver devices may be applied according to the present invention.

An acceleration sensing device, such as accelerometer 46, is mounted to the second sensor component of height sensor 36 by means of a bracket 48. Accelerometer 46 determines the acceleration of the vehicle body with respect to the surface upon which the vehicle is traveling. Accelerometer 46 may be of any known type of accelerometer such as a Piezo electric accelerometer, a Piezo resistive or a Piezo capacitive accelerometer. Accelerometer 46 is connected electrically to an integrated circuit board 44 mounted within bracket 48 of the second sensor component 40 of the height sensor 36. As will be explained in further detail below, the circuit board 44 is common to both the height sensor 36 and accelerometer 46 and supplied power to each sensing element from a vehicle power source such as the battery of the vehicle. The circuit board 44 includes a common oscillator circuit, a common input protection circuit and a power supply circuit so that a single circuit board may be utilized for both of the sensing elements. By contrast, the cited prior art teach separate circuit boards for each sensing element. By utilizing a single circuit board for the unitary sensor assembly of the present invention, a significant cost savings and simplification of this circuit can be realized. Furthermore, it is advantageous to obtain vertical position information and acceleration information from the same vehicle point in many known control strategies for active suspension type vehicles. By placing the accelerometer 46 directly in the location of the height sensor 36, it is not necessary to derive the vertical velocity of the body with respect to the surface upon which the vehicle is traveling through lengthy and complex calculations of the position of the suspension members with respect to time as shown in the '203 patent. Furthermore, it should be readily apparent to those skilled in the art that the sensor assembly of the present invention could be used at each wheel location within the vehicle or could be used at both front wheels and one rear wheel of the vehicle to develop information needed for any control strategy which may be utilized in a controlled suspension system. A suspension control system utilizing a sensor assembly of the present invention is valuable because the height sensor cooperates with the acceleration sensor and a suspension control module to produce signals indicative of not only the suspension's ride height but also indicating the relative velocity of the suspension and wheel and tire assembly with respect to the chassis at a coomon measuring point of the vehicle.

Figure 4:
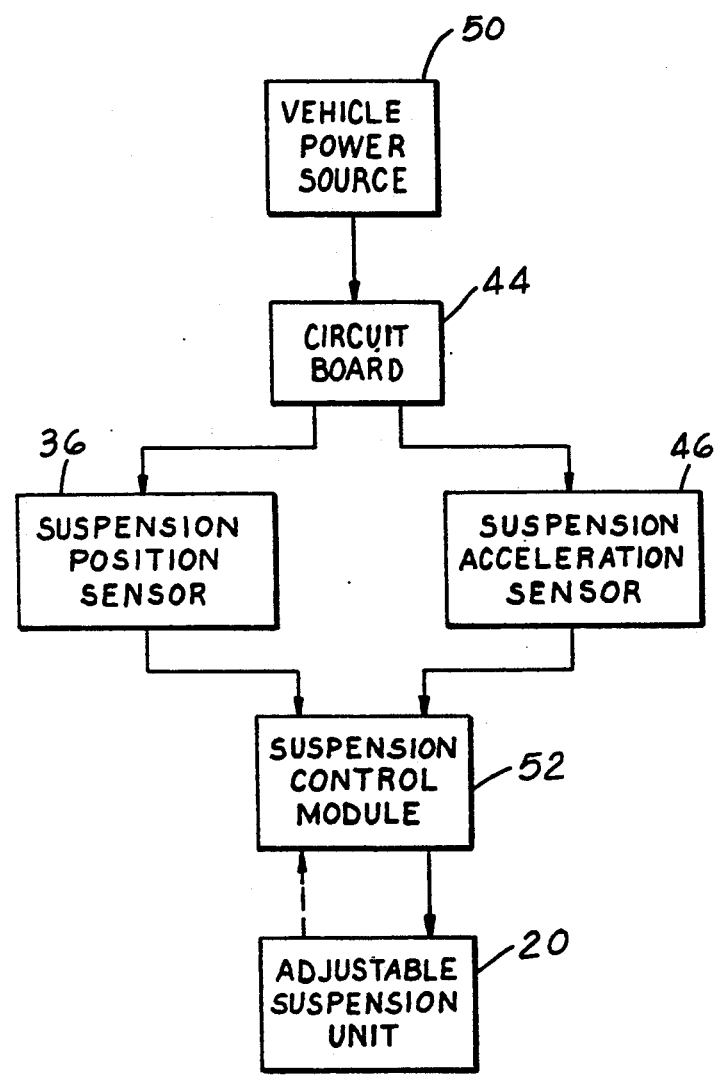
FIG. 4 is an overall system block diagram in accordance with an embodiment of the present invention.

FIG. 4 shows a system block diagram of a suspension control system utilizing a sensor assembly of the present invention. As shown in FIG. 4, a vehicle power source, such as a battery 50, supplies power to the circuit board 44 common to both the suspension position sensor 36 and the suspension acceleration sensor 46. Each of these sensors 36, 46 generates a set of signals indicative of the suspension position and acceleration with respect to the surface upon which the vehicle is traveling and sends the signals to a suspension control module 52. The suspension control module interacts with the adjustable suspension units 20 to either vary the ride height or to control the damping of the suspension system to achieve optimum performance according to a variety of known control strategies. The suspension control module 52 generally comprises a microprocessor. The microprocessor generally comprises an input interface, a central processing unit (CPU), a readable, addressable memory (RAM), a read only memory (ROM) and an output interface. The microprocessor is connected to the position sensor 36 and acceleration sensor 46 by means of the input interface. It has been determined that a type 8797 microprocessor by Intel Corp. is useful for practicing the present invention. Those skilled in the art will appreciate in view of this disclosure that other types of microprocessors may be useful for practicing this invention.

Figure 5:
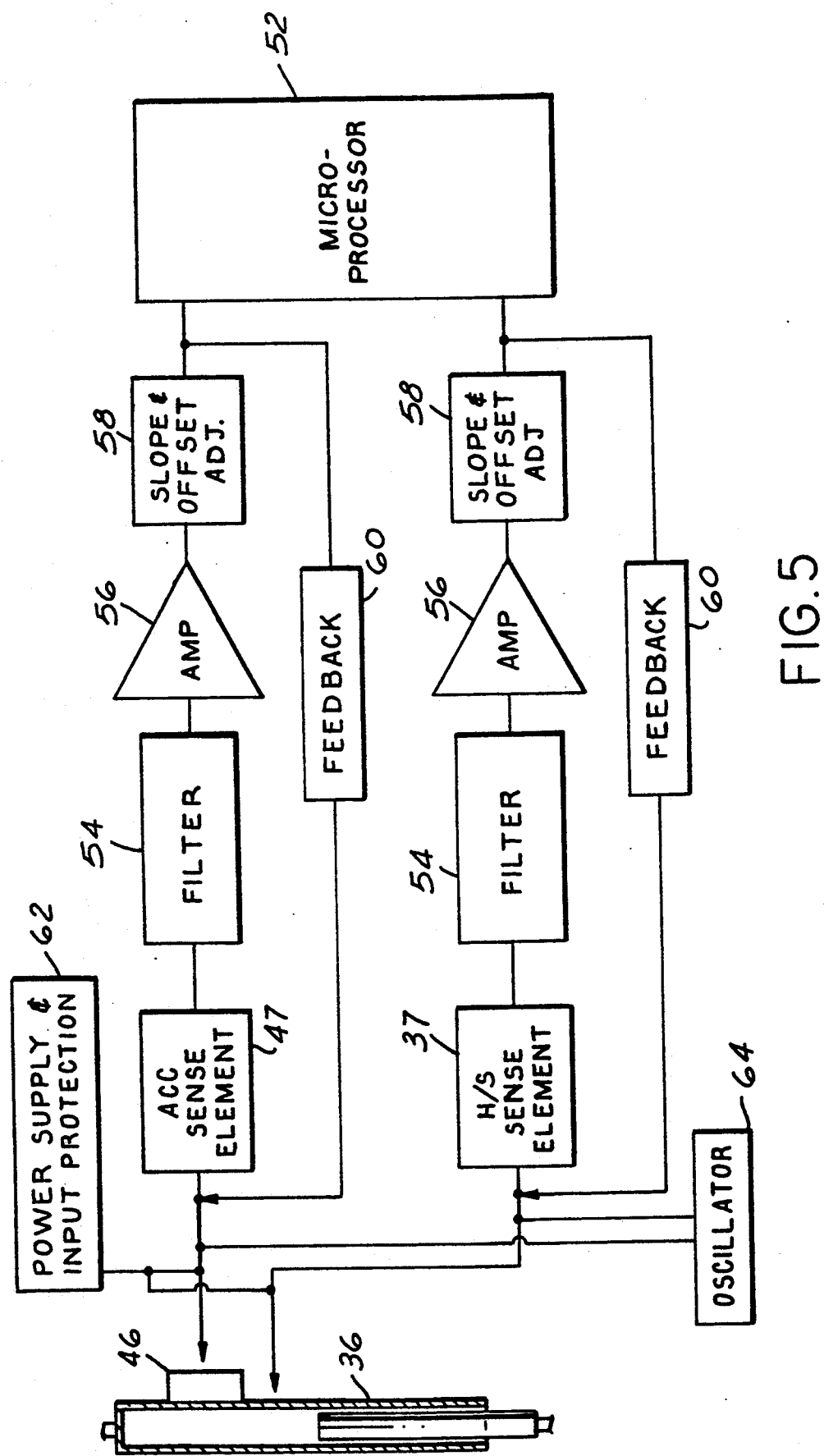
FIG. 5 is a schematic diagram of the sensor assembly of the present invention.

Referring now to FIG. 5, during operation of a control system utilizing a sensor assembly of the present invention, each of the position sensors 36 and the accelerometer 46 outputs a series of signals to the suspension control module 52. As stated above, the position sensor 36, through its sensing element 37, outputs a signal indicative of the operational position of the suspension with respect to the body of the vehicle while the accelerometer 46, though its sensing element 47, outputs a series of signals corresponding to the acceleration of the vehicle body with respect to the surface upon which the vehicle is traveling. As shown in FIG. 5, each of these signals first passes through a filter 54, typically a low pass filter, which filters out all of the nonessential information generated by each sensor. It should be readily apparent to those skilled in the art that other types of known filters can be used depending on the control strategy employed by the apparatus. The signals then pass through an amplifier 56. The amplifier 56 puts each of the signals at a level that the suspension control module 52 can read and interpret. After leaving the amplifier 56, the signals each pass through a slope and offset adjustment device 58 which calibrates the signal to be readable by the control module 52. A feedback circuit 60 may also be employed as a reiterative means to insure the accuracy of the signal that the control module is receiving. It should be apparent to those skilled in the art that the signals from each of the position sensor and accelerometer 46 is generated independently and sent to microprocessor 52 independently of one another as shown by the separate lines of FIG. 5.

As further shown in FIG. 5, the circuit board of the present invention utilizes a common oscillator 64 of a known type, a common input protection circuit 62 comprising mainly capacitors, diodes or varistors to protect the circuit from electrical spikes from the input of the vehicle battery. The circuit board also includes a common power supply means 62 to transmit the power from the vehicle power source to each of the sensor elements. As such, the circuit board comprises an electrical power transmission means for transmitting the power from the vehicle battery to the position sensor 36 and the accelerometer 46 as well as supplying the power to send a signal from the sensor elements to the control module.

Those skilled in the art will appreciate in view of this disclosure that a sensor assembly according to the present invention may be employed with a variety of known suspension control systems to provide information to those systems which is needed in the control strategies of the apparatuses. Furthermore, other types of detectors or switches could be employed within the height sensor according to the present invention, for example, magnetic reed switches or electromechanical devices could be utilized. These and all other variations and modifications of the present invention are possible without departing from its spirit and scope is defined by the appended claims.

What is claimed is:

1. A unitary sensor assembly for use in an automotive vehicle having a source of electrical power, a body and an automotive suspension relatively movable with respect to said body, comprising:
    a circuit board electrically connected to said power source and operative to receive an electrical signal therefrom, said circuit board having an oscillator circuit, an electrical input protection circuit and an electrical power supply circuit;
    first sensor means for receiving said electrical signal from said circuit board and for determining the operational position of said suspension with respect to said body, said means being electrically connected to said circuit board and including a first sensor component movable with respect to a second sensor component and means for attaching said first sensor component to said suspension and said second sensor component to said body such that said first and second sensor components will be caused to move with respect to one another when said suspension moves with respect to said body; and
    second sensor means for determining the acceleration of said body of said vehicle with respect to the surface upon which said vehicle is traveling, said second sensor means being operative to receive said electrical signal from said circuit board.

2. An assembly according to claim 1, wherein said second sensor means is mounted to said second sensor component of said first sensor means.

3. An assembly according to claim 1, wherein said circuit board is mounted to said second sensor component of said first sensor means.

4. An assembly according to claim 1, wherein said first sensor means comprises a linear height sensor.

5. An assembly according to claim 1, wherein said first sensor means comprises a rotary height sensor.

6. An assembly according to claim 1, wherein said second sensor means comprises an accelerometer.

7. A unitary sensor assembly for use in an automotive vehicle having a source of electrical power, a body and an automotive suspension relatively movable with respect to said body, comprising:
    a height sensor for determining the operational position of said body relative to said suspension, said height sensor including a first sensor component movable with respect to a second sensor component, said first sensor component being attached to said suspension and said second sensor component being attached to said body such that said first and second sensor components will be caused to move with respect to one another when said suspension moves with respect to said body;
    an accelerometer for determining the acceleration of the body of the vehicle with respect to the surface upon which the vehicle is traveling, said accelerometer being attached to said second sensor component of said height sensor; and
    a circuit board interposed between said accelerometer and said second sensor component, said circuit board being electrically connected to said power source and being operative to receive an electrical signal therefrom, said circuit board including an oscillator circuit, an electrical input protection circuit and an electrical power supply circuit operative to condition said electrical signal and transmit said electrical signal to both said height sensor and said accelerometer.

8. A sensor assembly according to claim 7, wherein said second sensor component includes a bracket attached to the outer periphery thereof, said bracket being configured to receive said circuit board and said accelerometer therein.

* * * * *